United States Patent
Kim et al.

(10) Patent No.: US 9,760,064 B2
(45) Date of Patent: Sep. 12, 2017

(54) WEARABLE ELECTRONIC DEVICE

(71) Applicant: Samsung Electronics Co., Ltd., Suwon-si (KR)

(72) Inventors: Jong Hae Kim, Seoul (KR); Chung Keun Yoo, Suwon-si (KR); Byoung Uk Yoon, Hwaseong-si (KR); Ik Su Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 17 days.

(21) Appl. No.: 15/049,337

(22) Filed: Feb. 22, 2016

(65) Prior Publication Data

US 2016/0252888 A1  Sep. 1, 2016

(30) Foreign Application Priority Data

Feb. 27, 2015  (KR) .................. 10-2015-0028129

(51) Int. Cl.
| | |
|---|---|
| *G06F 1/16* | (2006.01) |
| *H05K 5/00* | (2006.01) |
| *H05K 7/00* | (2006.01) |
| *G04G 21/00* | (2010.01) |
| *H04B 1/3827* | (2015.01) |
| *G04B 19/28* | (2006.01) |

(52) U.S. Cl.
CPC .......... *G04G 21/00* (2013.01); *G04B 19/283* (2013.01); *G06F 1/163* (2013.01); *H04B 1/3833* (2013.01)

(58) Field of Classification Search
CPC ........ G06F 1/163; G04G 21/00; G04G 17/00; G04G 17/08; G04G 17/083; G04B 19/283; G04B 19/286
USPC ..................................... 361/679.03
See application file for complete search history.

(56) References Cited

U.S. PATENT DOCUMENTS

| | | | |
|---|---|---|---|
| 6,529,713 B1* | 3/2003 | Seymour | H04M 1/05 368/13 |
| 6,556,222 B1* | 4/2003 | Narayanaswami | G04G 9/0064 368/295 |

(Continued)

FOREIGN PATENT DOCUMENTS

EP  2733579 A2  5/2014

OTHER PUBLICATIONS

Communication with extended European Search Report corresponding to European Application No. EP 16157774.7, Aug. 2, 2016.

*Primary Examiner* — Anthony Haughton
(74) *Attorney, Agent, or Firm* — McAndrews, Held & Malloy, Ltd.

(57) ABSTRACT

A wearable electronic device includes an external housing including a first surface, a second surface toward a direction opposite to the first surface, and a first opening formed through the first surface; a display disposed in the opening; a plate covering the display, forming at least a portion of the first surface, and having a substantially circular shape; a first structure forming a portion of the external housing or extending from the external housing; a bezel surrounding an outer circumferential surface of the plate, mounted on the external housing to be rotatable, and including a surface toward a portion of a surface of the first structure; and a second structure disposed between the portion of the surface of the first structure and the surface of the bezel and attached to the first structure. The second structure has a friction coefficient smaller than a friction coefficient of the first structure.

17 Claims, 20 Drawing Sheets

(56) References Cited

U.S. PATENT DOCUMENTS

| | | |
|---|---|---|
| 7,111,978 B2 | 9/2006 | Gerber |
| 8,142,069 B2 | 3/2012 | Muller et al. |
| 8,773,847 B2 * | 7/2014 | Byun ..................... H04B 1/385 |
| | | 361/679.03 |
| 2002/0101457 A1 * | 8/2002 | Lang ....................... G06F 1/163 |
| | | 715/856 |
| 2005/0007890 A1 * | 1/2005 | Bertrand .............. G04B 19/283 |
| | | 368/294 |
| 2006/0070106 A1 * | 3/2006 | Kitazato .............. H04N 9/8042 |
| | | 725/88 |
| 2006/0114753 A1 * | 6/2006 | Gerber ................ G04B 19/283 |
| | | 368/295 |
| 2008/0192586 A1 * | 8/2008 | Carrard ................. G04B 37/08 |
| | | 368/295 |
| 2008/0225650 A1 * | 9/2008 | Muller ................... G04B 37/00 |
| | | 368/310 |
| 2009/0040882 A1 | 2/2009 | Hiranuma et al. |
| 2016/0252980 A1 * | 9/2016 | Park ....................... G06F 3/0362 |
| | | 345/184 |
| 2016/0255733 A1 * | 9/2016 | Jung ..................... G06F 1/1633 |
| | | 361/759 |
| 2016/0327916 A1 * | 11/2016 | Kim ....................... G06F 3/0362 |

\* cited by examiner

WEARABLE ELECTRONIC DEVICE

CROSS-REFERENCE TO RELATED APPLICATION(S)

This application claims the benefit under 35 U.S.C. §119 (a) of a Korean patent application filed on Feb. 27, 2015 in the Korean Intellectual Property Office and assigned Serial number 10-2015-0028129, the entire disclosure of which is hereby incorporated by reference.

BACKGROUND

The present disclosure relates to a wearable electronic device.

Small-size electronic devices may be carried in a user's pocket, and/or may be worn on a user's wrist or a specific portion of a user's body, e.g., a head, a neck, an arm, etc. Such the device is called a wearable device.

In some forms, a wearable device may include a main body performing intrinsic functions of the electronic device and a connector, such as a strap, disposed on the main body. The strap may enable the user to fix the main body to the user's body or a specific structure using a predetermined length of strap.

Wearable devices may be independently used or used with other electronic devices. In the situation where a wearable device is used with other electronic devices, a communication method with a local area communication module may applied between the wearable device and other electronic device(s), and, thus, other electronic devices are prevented from being inconveniently and frequently used.

Since the wearable device has a small size and slim shape, there may be a limitation to realizing the functions of the wearable device. Accordingly, the wearable device may incorporate various user interfaces (UI) by hardware- or software-based techniques to realize certain functions of the wearable device.

Some conventional electronic devices, such as a smart watch, have a substantially quadrangular shape. Therefore, the quadrangular shape partially limits the UI realized in the electronic device due to the limitation in shape of the electronic device. In addition, typically the user of conventional smartwatch may be need to turn a stem, which is installed at a side surface of the electronic device, in order to control or operate the electronic device.

SUMMARY

Aspects of the present disclosure are to address at least the above-mentioned problems and/or disadvantages and to provide at least the advantages described below. Accordingly, an aspect of the present disclosure is to provide a wearable electronic device including a plate in which an outer circumferential surface thereof has a curved surface.

An aspect of the present disclosure is to provide a wearable electronic device has a bezel structure in which a user feels gentle resistance and click while the bezel rotates.

In accordance with an aspect of the present disclosure, a wearable electronic device includes an external housing including a first surface, a second surface toward a direction opposite to the first surface, and a first opening formed through the first surface, a display disposed in the opening, a plate covering the display, forming at least a portion of the first surface, and having a substantially circular shape, a first structure forming a portion of the external housing or extending from the external housing, a bezel surrounding an outer circumferential surface of the plate, mounted on the external housing to be rotatable, and including a surface toward a portion of a surface of the first structure, and a second structure disposed between the portion of the surface of the first structure and the surface of the bezel and attached to the first structure. The second structure has a friction coefficient smaller than a friction coefficient of the first structure.

According to various embodiments of the present disclosure, although the bezel is rotated, the friction between the bezel and the external housing may be reduced by the second structure, and thus a noise generated during the rotation of the bezel may be reduced.

According to various embodiments of the present disclosure, the user may feel the gentle resistance due to the second structure during the rotation of the bezel.

According to various embodiments of the present disclosure, the user may sense the rotation of the bezel by the magnetic substance.

According to various embodiments of the present disclosure, the rotation state of the bezel may be sensed by the sensor sensing the rotation of the bezel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
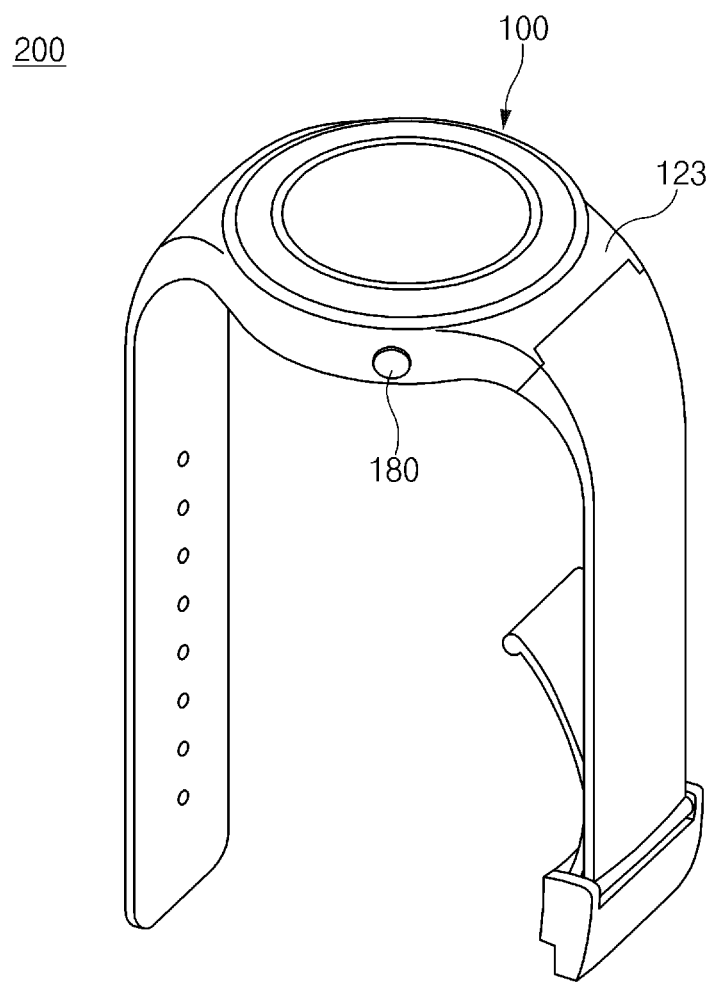
FIG. 1 is a perspective view showing an electronic device to which a bezel structure is applied according to various embodiments of the present disclosure.
Figure 2:
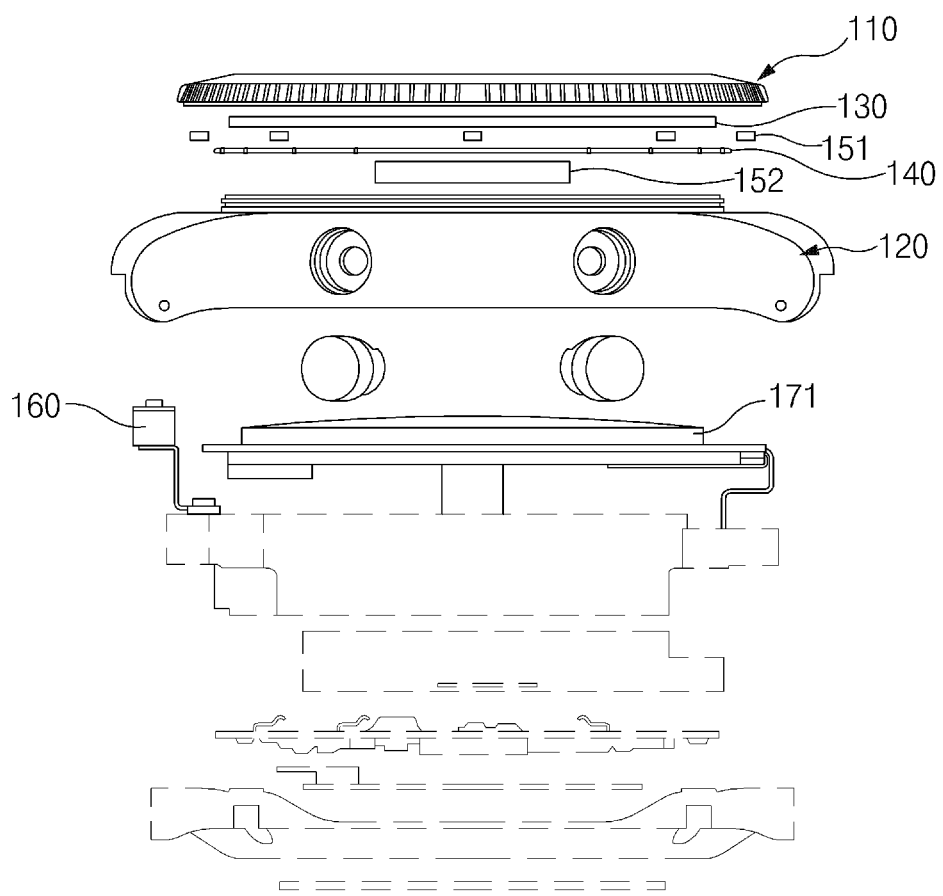
FIG. 2 is an exploded view showing a bezel structure according to various embodiments of the present disclosure.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have," "may have," "include" and "comprise," or "may include" and "may comprise" used herein indicate existence of corresponding features (e.g., elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for," "having the capacity to," "designed to," "adapted to," "made to," or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, and/or wearable devices. According to various embodiments, the wearable devices may include at least one of accessories (e.g., watches, rings, bracelets, ankle bracelets, necklaces, glasses, contact lenses, head-mounted-devices (HMDs), etc.), fabric- or clothing-mounted devices (e.g., electronic apparels), body-mounted devices (e.g., skin pads, tattoos, etc.), bio-implantable devices (e.g., implantable circuits), and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices, navigation devices, global navigation satellite systems (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to a certain embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. According to a certain embodiment of the present disclosure, an electronic device may be a flexible electronic device. Also, electronic devices according to various embodiments of the present disclosure are not limited to the above-mentioned devices, and may include new electronic devices according to technology development According to various embodiments, a wearable electronic device 200 may have a substantially circular shape and may include a display 171, a window, and an interface providing a user input part at a front side, a body case providing an appearance of an accommodating space accommodating internal elements of the wearable electronic device 200, a cover housing disposed at a rear side to seal the accommodating space, which is mainly attached to or makes contact with a user, and a binder 123 connected to the body case 120 and worn on the user. A bezel 110, which includes various input and output function parts, may be formed adjacent to the display 171 and may further include a wheel structure that is rotatable to realize various functions. A push button 180 serving as an input device or a button having a winding stem structure of a watch may be further disposed around the body case, and a recess and a protrusion, which are engaged with a buckle, may be further disposed at the other end engaging with the buckle. The binder 123 may be replaced with another binder as a conventional watch since the binder 123 is engaged in a spring bar shape.

According to various embodiments, a bezel structure 110 may surround a display module including the display 171 and the plate (window) 172 surrounding the display. The wearable electronic device 200 according to various embodiments may include an external housing 120 including a first surface, a second surface toward a direction opposite to that of the first surface, and an opening formed through the first surface. A display 171 may be disposed in the opening. A plate 172 may cover the display, forming at least a portion of the first surface, and having a substantially circular shape. A first structure 121 may form a portion of the external housing or extending from the external housing. The bezel 110 may include a surface toward a portion of surface of the first structure 121, and a second structure 130 disposed between the portion of the surface of the first structure 121 and the surface of the bezel 110. The second structure 130 may be attached to the first structure 121, which surrounds an outer circumferential surface of the plate 172 and is rotatably mounted on the external housing 120. The second structure 130 has a friction coefficient smaller than a friction coefficient of the first structure 121.

According to various embodiments, the first structure 121 may be protruded upward from the external housing 120 and may have a hook shape, by way of representative example. An extending part 157 is located near and along the periphery of the bezel 110. The extending part 157 comprises a plurality of the magnetic substances 153 arranged along the extending part external housing 120. The plurality of magnetic substances 153 may comprise a plurality of portions having different polarities from each other and disposed along the extending part 157. The extending part 157 is placed to surround at least a portion of the outer circumferential surface of the plate 172 when viewed from an upper side of the plate 172.

According to various embodiments, the second structure 130 may be inserted between the bezel 110 and the external housing 120 and the first structure 121 may make contact with the second structure 130.

Referring to FIGS. 1 to 3 and 5, the bezel 110 according to various embodiments may be rotatably disposed to surround the outer circumference surface of the display 171 corresponding to a display member in the wearable electronic device 200, such as a smart watch, and the plate 172 covering the display 171. The outer circumferential surface of the plate 172 may have a substantially circular shape or a substantially oval shape. According to various embodiments, the bezel 110 may surround the plate 172, and to this end the bezel 110 may include a hole defined therein, to which the display 171 and the plate 172 are inserted. An inner circumferential surface of the bezel 110 may be a curved surface. According to various embodiment of the present disclosure, the external housing 120 may further include the binder 123 mounted on a side portion thereof to be attachable to and detachable from an external substance or a portion of a human's body.

According to various embodiments, the external housing 120 may further include a processor and a memory therein, which are electrically connected to the display 171, and the memory may store instructions allowing the processor to change and display a user interface on the display in response to the rotation of the bezel.

Figure 3:
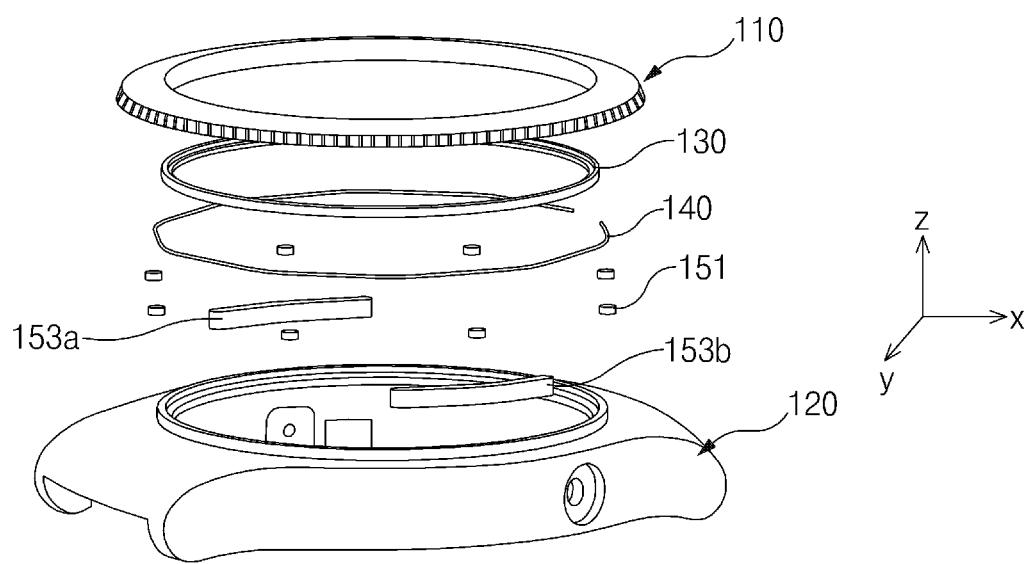
FIG. 3 is an exploded perspective view showing a bezel structure according to various embodiments of the present disclosure.
Figures 17A, 17B:
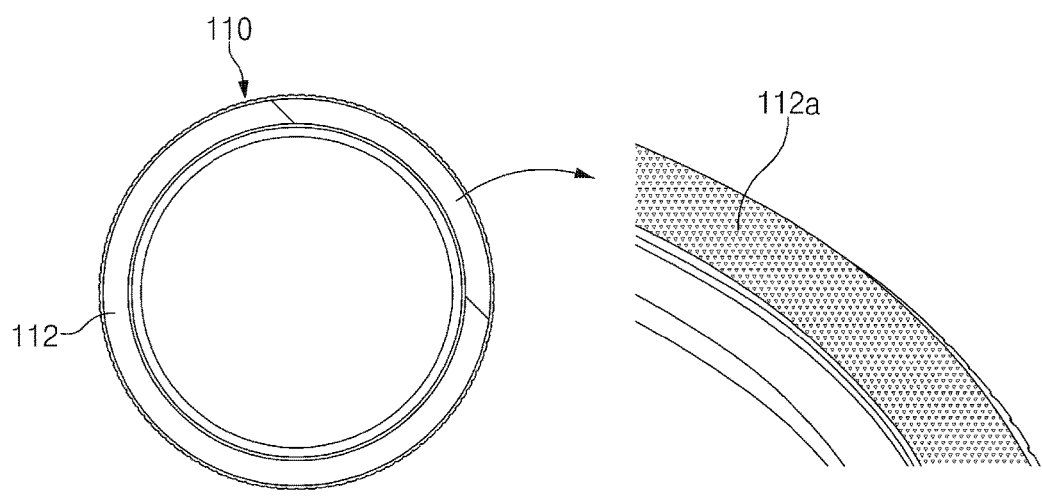
FIGS. 17A and 17B are plan views showing a first sensor and a second sensor according to various embodiments of the present disclosure.

Referring to FIG. 3, the external housing 120 according to various embodiments may correspond to a housing disposed under a display 171 in the wearable electronic device 200, such as a smartwatch, may include a recess formed at a center portion thereof to accommodate the display 171, and disposed under the bezel 110 such that an upper surface thereof makes contact with a lower surface 112 of the bezel 110 (e.g., as shown in FIG. 17B).

Figure 5:
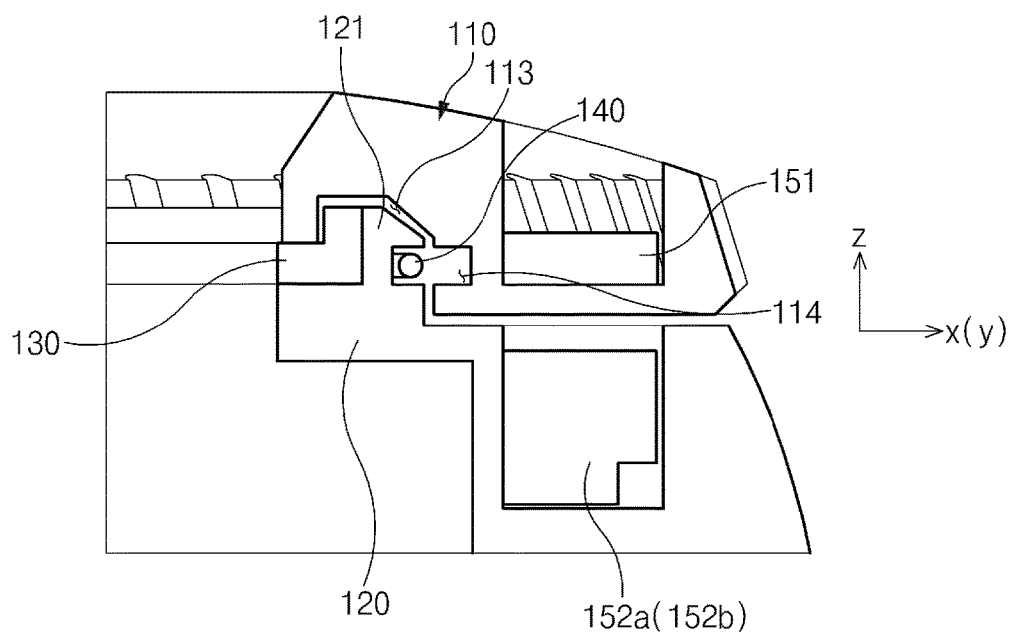
FIGS. 5 and 6 are cross-sectional views showing a bezel structure according to various embodiments of the present disclosure.

Referring to FIGS. 3 and 5, the bezel structure 110 according to various embodiments of the present disclosure may include the second structure 130 that is inserted between the bezel 110 and the external housing 120 and that is disposed between the lower surface 112 of the bezel 110 and the upper surface of the external housing 120.

Referring to FIG. 3, the second structure 130 according to various embodiments may be inserted between the bezel 110 and the external housing 120 along the outer circumferential surface of the display 171 and may have one of a circular shape, an oval shape, and a polygonal shape as the shape of the outer circumferential surface of the display 171.

According to various embodiments, the second structure 130 may include a material having elasticity, e.g., a rubber, a plastic material, etc., an insulating material, or a synthetic resin having a relatively small frictional force when compared with surrounding structures and may include at least a surface or shape, which frictionizes with the portion of the surface of the bezel 110 while rotating. According to various embodiments, the second structure 130 may have a structure that may be placed on an assembly structure of the external housing 120 and assembled with the external housing 120. The second structure 120 may have a structure that may be assembled with an assembly structure of the bezel.

Accordingly, the second structure 130 according to various embodiments, which is inserted into between the bezel 110 and the external housing 120, may minimize the friction between the bezel 110 and the external housing 120, and may reduce a noise generated by the friction between the bezel 110 and the external housing 120 during the rotation of the bezel 110. In addition, the user may feel a slight resistance when the bezel 110 is rotated.

Referring to FIGS. 3 and 5, the bezel 110 may include a recess 113 formed by inwardly recessing an upper portion of the bezel 110 to allow the second structure 130 to be securely inserted into between the bezel 110 and the external housing 120, and a separation preventing part 140 may have a structure in which one side portion is protruded to be inserted into the recess 113 formed in the bezel 110.

Referring to FIGS. 3 to 7, the bezel structure 110 according to various embodiments may include the separation preventing part 140 to prevent the bezel 110 from being separated from a front case. According to various embodiments, the separation preventing part 140 may have a polygonal ring shape or substantially ring shape, and the separation preventing part 140 may have a polygonal shape such that the separation preventing part 140 is alternately inserted into the recess 114 (e.g., see FIG. 5) recessed inward from an upper portion of the external housing 120 and the recess 114 formed in the bezel 110.

Figure 7:
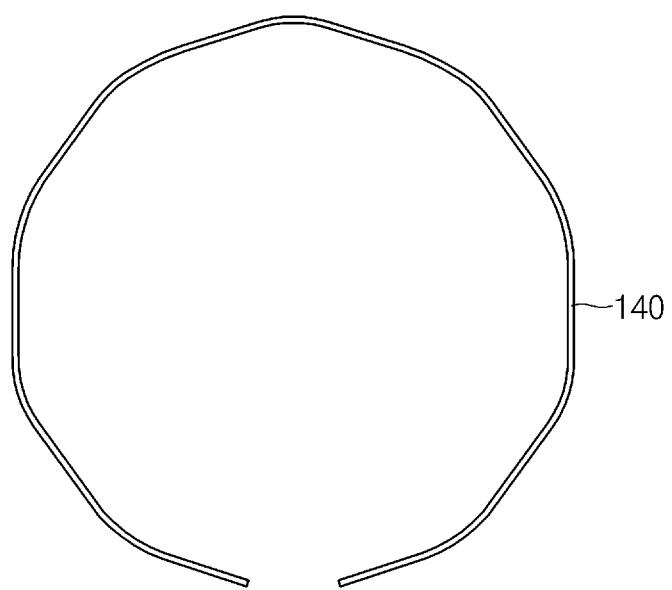
FIG. 7 is a top plan view showing a separation preventing part according to various embodiments of the present disclosure.

According to various embodiments, the separation preventing part 140 may have various shapes, e.g., a circular shape, an oval shape, etc., except for the polygonal shape shown in FIG. 7 as long as the separation preventing part 140 may be alternately inserted into recesses 114 formed in the second structure 130 and the bezel 110.

Figure 4:
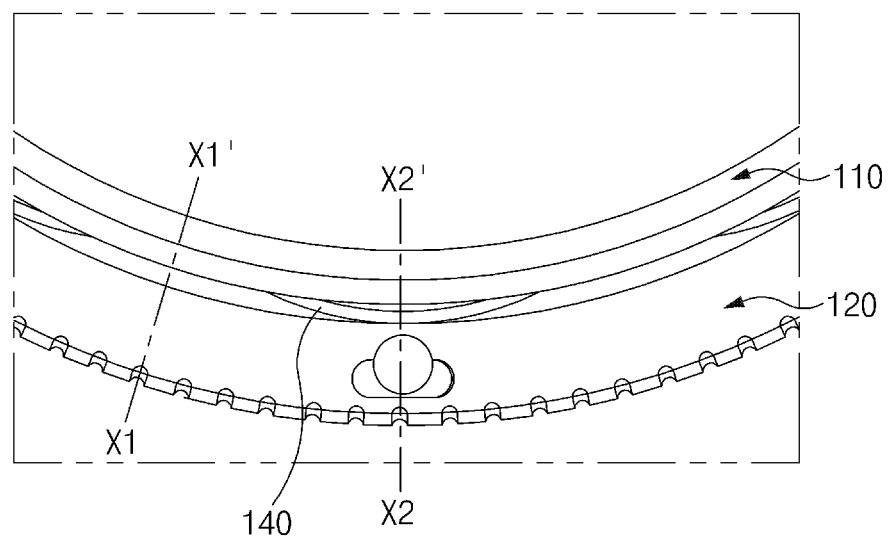
FIG. 4 is a partially enlarged view showing a separation preventing part according to various embodiments of the present disclosure.
Figure 6:
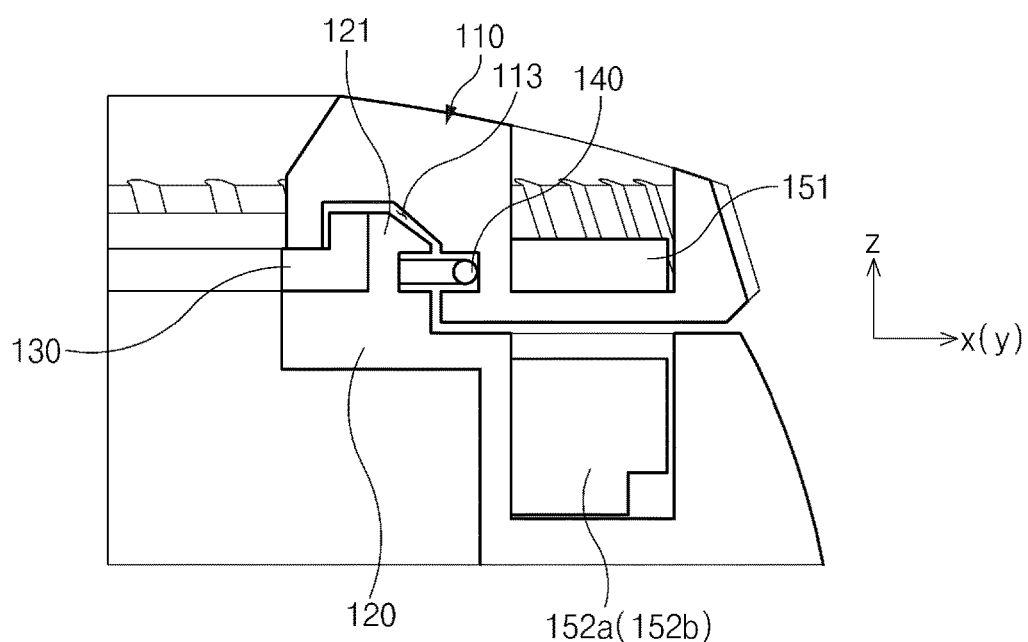

As shown in FIGS. 4 to 6, according the bezel structure 110 according to various embodiments of the present disclosure, the separation preventing part 140 may be alternately inserted into the recess 114 may be recessed inwardly of the front case, which is in a fixed state, and the recess 114 recessed to one side of the bezel 110, which may be separated from the upper portion of the external housing 120, the bezel 110 may be prevented from the external housing 120 in a vertical direction, i.e., a z-direction. In this case, since the separation preventing part 140 restricts a movement of the bezel 110 along the vertical direction from the external housing 120 and does not restrict the movement of the bezel 110 in a horizontal direction, i.e., x- and y-directions, the bezel 110 may be rotated without being separated from the housing 120.

Figure 8:
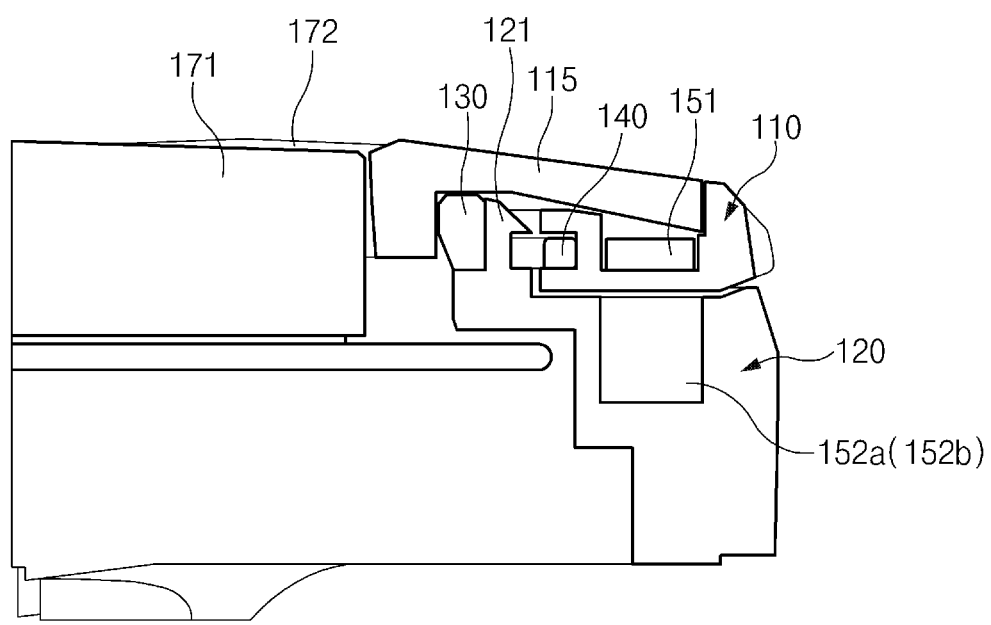
FIG. 8 is a cross-sectional view showing a bezel structure according to various embodiments of the present disclosure.

Referring to FIG. 8, the bezel 110 according to various embodiments may further include an insulating part 115 formed of an insulating material to prevent the display 171 from making contact with the external housing 120 formed of a metallic material. Thus, the insulating part 115 may allow an antenna installed at the display 171 or disposed adjacent to the display 171 to be spaced apart from the external housing 120 formed of the metallic material, so that the capacity of the antenna may be prevented from being deteriorated.

According to various embodiments of the present disclosure, the bezel structure 110 may further include a magnetic substance such that the bezel 110 stops after being rotated by a predetermined angle while rotating on the external housing 120.

Figure 9A:
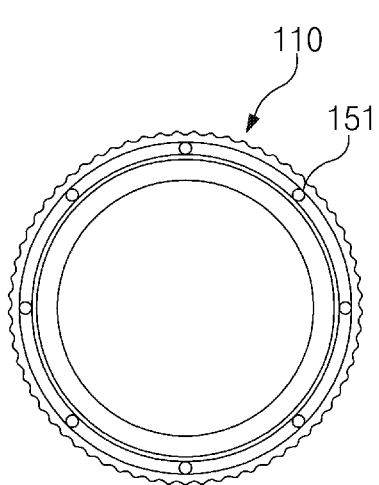
FIG. 9A is a plan view showing a wearable electronic device including a magnetic substance according to various embodiments of the present disclosure.
Figure 9B:
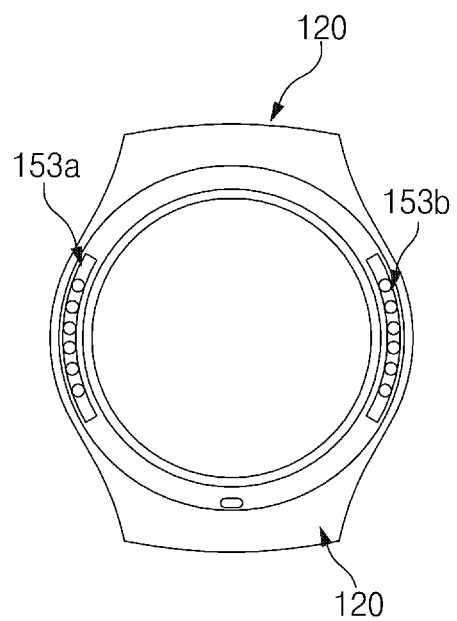
FIG. 9B is a plan view showing a wearable electronic device including a magnetic substance including a binder according to various embodiments of the present disclosure.
Figure 10A:
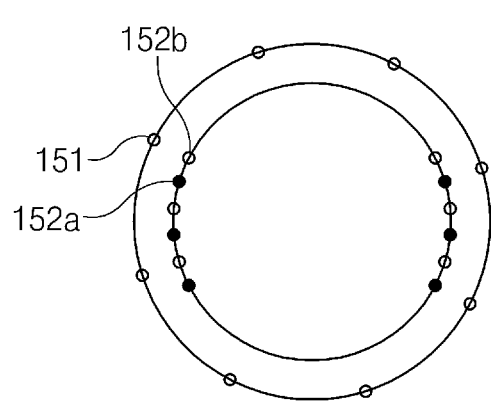
FIG. 10A is a view showing a position of a magnetic substance according to various embodiments of the present disclosure.
Figure 10B:
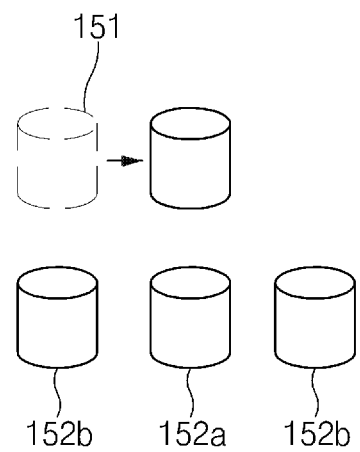
FIG. 10B is a view showing a position of a first magnetic part in relation to second magnetic parts according to various embodiments of the present disclosure.

Referring to FIGS. 9 and 10, the bezel 110 and the external housing 120 according to various embodiments of the present disclosure may include one or more magnetic substances. According to various embodiments of the present disclosure, the one or more magnetic substances may be configured to include a plurality of magnetic substances arranged along the periphery of the bezel 110 and spaced apart from each other.

According to various embodiments, a plurality of magnetic substances (first polarity) 151 may be arranged on the lower surface 112 of the bezel 110 such that the magnetic substances 151 are spaced apart from each other at regular intervals with respect to the center of the bezel 110. According to various embodiments, the magnetic substance may include a magnetic substance 152a disposed at a side of the external housing 120, which may be disposed under the bezel 110, and having a second polarity different from the first polarity of the magnetic substances 151.

Referring to FIGS. 9 and 10, a plurality of magnetic substances (first polarity) 151 according to various embodiments may be disposed in the bezel 110 and disposed under the plurality of magnetic substances (first polarity) 151 in the upper surface of the external housing 120.

For example, referring to FIGS. 9 and 10, eight magnetic substances (first polarity) 151 may be arranged on the bezel at regular intervals, and three second magnetic parts 152 may be arranged on the front case. In this case, an attractive force may act between the magnetic substance (first polarity) 151 and the magnetic substance (second polarity) 152a.

Accordingly, in the case where the bezel 110 is rotated, the attractive force may act between one of the magnetic substances (first polarity) 151 and one of the magnetic substances (second polarity) 152a when the one of the magnetic substances (first polarity) 151 is close to the one of the magnetic substances (second polarity) 152a, and thus the bezel 110 may be maintained in a stop state. The state, in which the attractive force acts between the magnetic substance (first polarity) 151 and the second magnetic part 152, does not mean that the bezel 110 is impossible to be rotated and does mean that the bezel 110 is possible to be rotated in the case where the user applies an external force to the bezel 110. The user may recognize that the bezel 110 is stopped during the state in which the attractive force acts between the magnetic substance (first polarity) 151 and the magnetic substance (second polarity) 152a close to the magnetic substance (first polarity) 151. In addition, in the case where the bezel 110 is continuously rotated, the user may feel that the bezel 110 is temporarily stopped (hereinafter, referred to as "click sense") in accordance with the number of the magnetic substances (first polarity) 151 and the number of the magnetic substances (second polarity) 152a.

As an example, in the case where the eight magnetic substances (first polarity) 151 are arranged on the bezel 110 and the three second magnetic parts 152 are arranged on the external housing 120, the bezel 110 may be temporarily maintained twenty-four times in the stop state since the attractive force acts between each of the magnetic substances (first polarity) 151 and the magnetic substance (second polarity) 152a, and the user may feel the click sense twenty-four times.

Referring to FIGS. 9 and 10, the magnetic substance according to various embodiments may include the magnetic substances (second polarity) 152a different from the first polarity of the magnetic substances 151 and magnetic substances 152b having the same first polarity as the magnetic substance 151 and alternately arranged with the magnetic substances 152a. In the present embodiment, the attractive force may act between the magnetic substances (first polarity) 151 and the magnetic substances (second polarity) 152a as described above, and a repulsive force may act between the magnetic substances (first polarity) 151 and the magnetic substances (first polarity) 152b. In this case, the attractive force may act between the magnetic substance (first polarity) 151 and the magnetic substance (second polarity) 152a, the repulsive force may act between the magnetic substance (first polarity) 151 and the magnetic substance (first polarity) 152b, and the magnetic substance (first polarity) 152b may be disposed at both sides of the magnetic substance (second polarity) 152a. Therefore, the user may feel the click sense at both sides of the magnetic substance (second polarity) 152a.

As an example, the second magnetic part 152 may include three magnetic substances (second polarity) 152a having different polarity from that of the magnetic substance (first polarity) 151 and three magnetic substances (first polarity) 152b having the same polarity as that of the magnetic substance (first polarity) 151 and disposed at both sides of the magnetic substance (second polarity) 152a. Accordingly, the user may feel the click sense twenty-four times since the attractive force acts between the magnetic substance (first polarity) 151 and the magnetic substance (second polarity) 152a, and in this case, since the repulsive force acts between the magnetic substance (first polarity) 151 and the magnetic substance (first polarity) 152b, the user may feel the strong click sense before and after the attractive force acts between the magnetic substance (first polarity) 151 and the magnetic substance (second polarity) 152a.

Referring to FIGS. 9 and 10, the second magnetic part 152 according to various embodiments may include a plurality of magnets forming one set.

According to various embodiments, the magnetic substance may include three conventional magnet sets arranged such that polarities thereof are alternated or a CMR magnet in which different polarities are alternately applied to one magnet.

According to various embodiments, a group 153 may include the magnetic substances (second polarity) 152a arranged on the same circumference to be adjacent to each other within an angle range smaller than about 180 degrees with respect to the external housing 120.

Referring to FIGS. 3, 9, and 10, the magnetic substance set according to various embodiments may include a first set of magnetic substances 151 and a second set of magnetic substances 153a and 153b, which are arranged to be symmetrical with each other with respect to a center portion of the external housing 120. In addition, the magnetic substance (second polarity) 152a formed in each group 153 may be disposed on the external housing 120 while being inserted in a body.

Figure 11A:
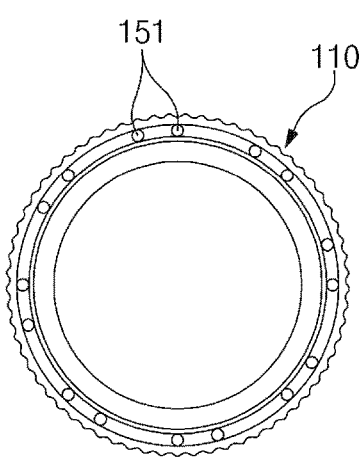
FIG. 11A is a plan view showing a wearable electronic device including a magnetic substance according to various embodiments of the present disclosure.
Figure 11B:
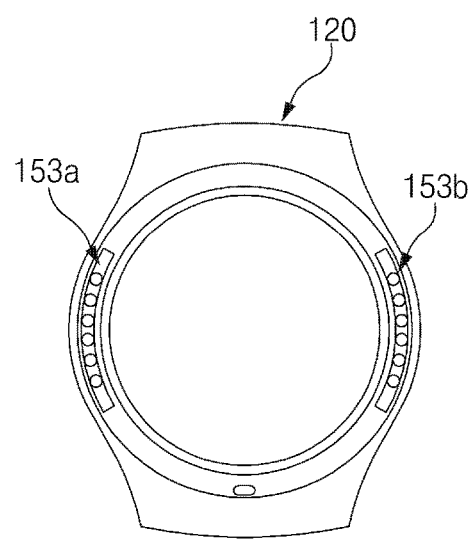
FIG. 11B is a plan view showing a wearable electronic device including a magnetic substance including a binder and an extending part according to various embodiments of the present disclosure.

Referring to FIGS. 9, 10 and 11, the second set of magnetic substances 153a disposed in the first set of magnetic substances 153a may be arranged at positions symmetrical with each other with respect to the center portion of the external housing 120.

Figure 12:
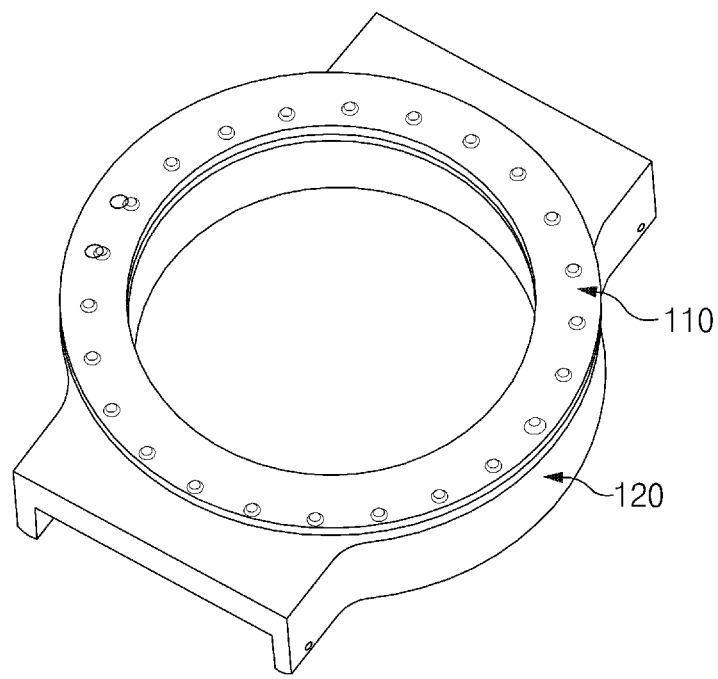
FIG. 12 is a perspective view showing a wearable electronic device according to various embodiments of the present disclosure.
Figure 13:
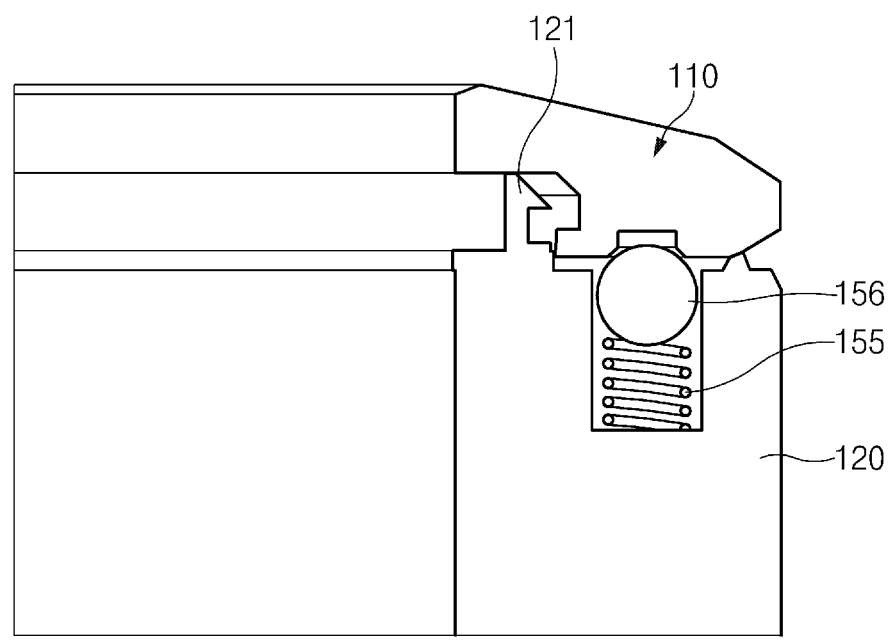
FIG. 13 is a cross-sectional view showing a bezel structure provided with an elastic member and an insertion member according to various embodiments of the present disclosure.

Referring to FIGS. 12 and 13, the wearable electronic device 200 according to various embodiments may include an elastic member 155, such as a spring, and an insertion member 156 supported by the elastic member 155, which are disposed in the external housing 120. In this case, the bezel 110 may include a hole formed in a lower surface thereof, into which the insertion member 156 is inserted. As an example, the insertion member 156 may have a substantially ball shape.

According to various embodiments, each of the elastic member 155 and the insertion member 156 may be provided in a plural number as the above-mentioned magnetic substances and may be arranged to be spaced apart from each other by a predetermined angle with respect to the center portion of the external housing 120. The hole formed in the lower surface of the bezel 110 may be provided in a plural number and the holes may be formed to be spaced apart from each other by the predetermined angle with respect to the center portion of the bezel 110. The insertion member 156 may supported by an elastic member 155 at an inner upper surface of the external housing 120, such that the insertion member 156 is inserted into the holes while being disposed at a lower end of the holes.

Accordingly, since the holes formed in the lower surface of the bezel 110 are rotated when the bezel 110 is rotated, the insertion member 156 may make contact with the lower surface of the bezel 110, in which the holes are not formed. Then, in the case where the insertion member 156 is inserted into the holes formed in the lower surface of the bezel 110, the user may feel the click sense due to the rotation of the bezel 110.

Referring to FIG. 14 through FIGS. 17A and 17B, the bezel structure 110 according to various embodiments may further include a sensor 160 to sense the rotation of the bezel 110 while the bezel 110 is rotated.

Referring to FIGS. 17A and 17B, according to various embodiments, in order to allow the bezel position sensing part to sense the rotation of the bezel 110, the bezel 110 according to various embodiments may include a pattern 112a formed on the lower surface of the bezel 110, as illustrated in FIG. 17B. The pattern 112a formed on the lower surface of the bezel 110 may be a pattern 112a defined by various geometric shapes, a pattern 112a defined by various colors, a pattern 112a defined by a variation of shade, or a pattern 112a defined by corrosion.

According to various embodiments, the sensor 160 sensing the rotation of the bezel 110 may include a first sensor 161 disposed adjacent to the lower surface 112 of the bezel 110 on the external housing 120 to sense the pattern 112a formed on the lower surface of the bezel 110, and the first sensor 161 may be an optical finger navigation (OFN) sensor.

According to various embodiments, the pattern 112a formed on the lower surface 112 of a portion of the bezel 110, and the sensor 160 may senses the pattern 112a when the bezel 110 is rotated. Therefore, the sensor 160 may sense whether the bezel 110 is rotated.

Figure 16:
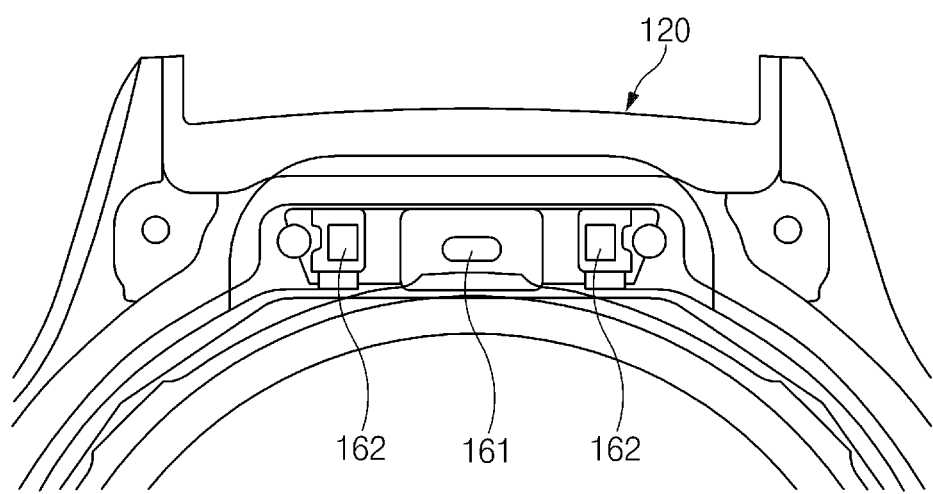
FIG. 16 is a bottom plan view showing a lower surface of a bezel according to various embodiments of the present disclosure.

Referring to FIG. 16, the sensor 160 sensing the rotation of the bezel 110 according to various embodiments may further include a second sensor 162 to sense a magnetic force of the magnetic substance (first polarity) 151 installed at the bezel 110, and the second sensor 162 may be a hall sensor sensing the magnetic force. According to various embodiments, in the case where the bezel 110 is rotated, the first magnetic part attached to the bezel 110 may be rotated and the second sensor 162 may sense the magnetic force of the first magnetic part, and thus the rotation of the bezel 110 may be sensed.

Figure 14:
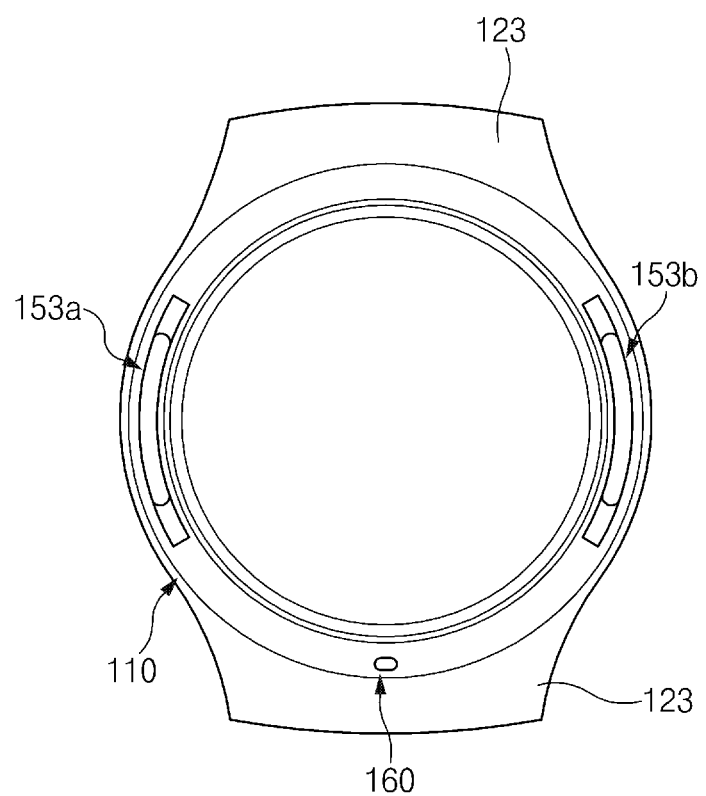
FIG. 14 is a plan view showing a wearable electronic device including a sensor sensing a rotation of the bezel according to various embodiments of the present disclosure.
Figure 15:
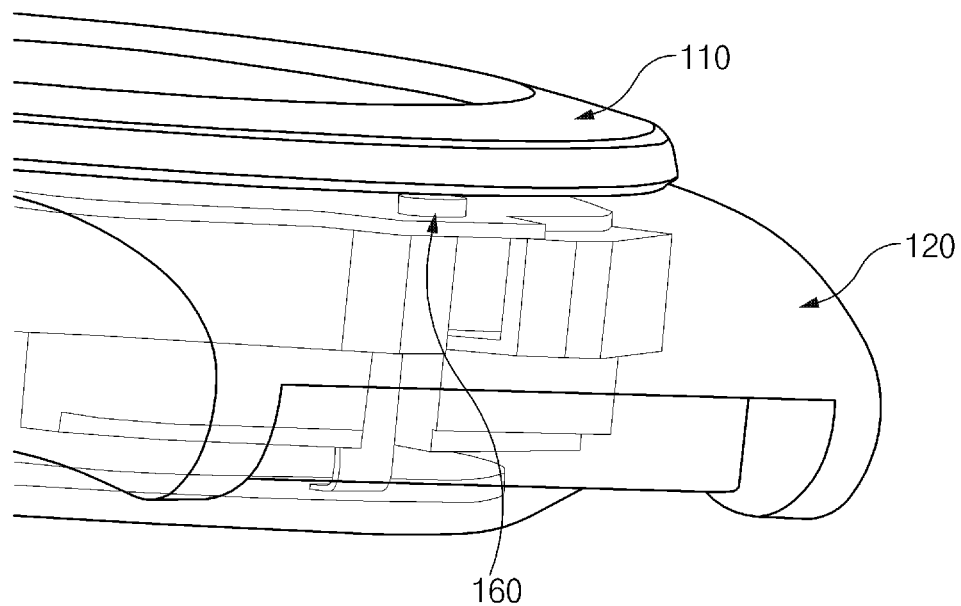
FIG. 15 is a perspective view showing a wearable electronic device including a sensor sensing a rotation of the bezel according to various embodiments of the present disclosure.

Referring to FIGS. 14, 17A and 17B, the bezel position sensing part according to various embodiments may be disposed at a position of the external housing 120, which is adjacent to the binder 123 worn on the portion of the human's body, e.g., a wrist.

Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

Figure 18:
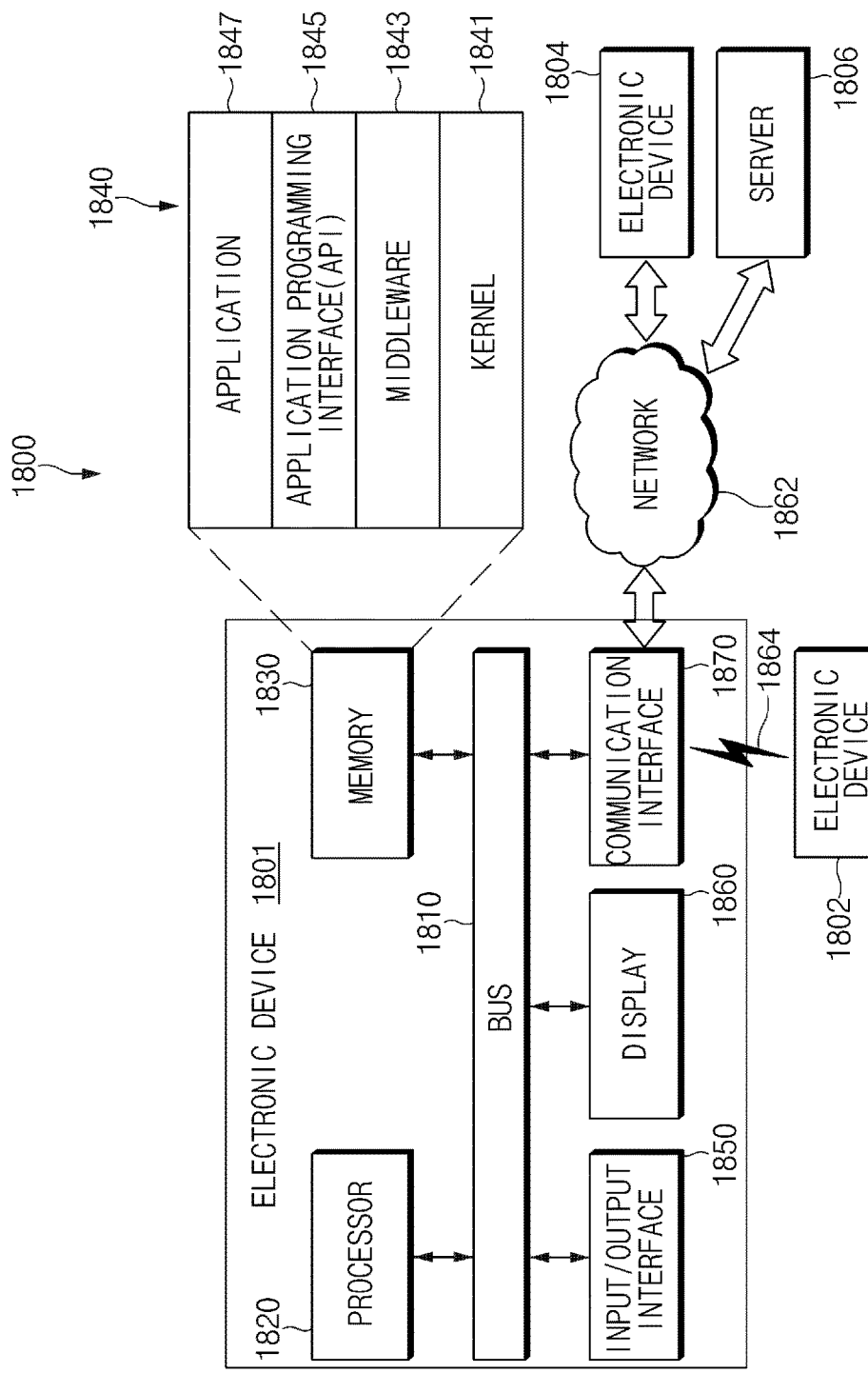
FIG. 18 illustrates an electronic device in a network environment according to various embodiments of the present disclosure.

Referring to FIG. 18, there is illustrated an electronic device 1801 in a network environment 1800 according to various embodiments of the present disclosure. The electronic device 1801 may include a bus 1810, a processor 1820, a memory 1830, an input/output (I/O) interface 1850, a display 1860, and a communication interface 1870. According to an embodiment of the present disclosure, the electronic device 1801 may not include at least one of the above-described components or may further include other component(s).

The bus 1810 may interconnect the above-described components 1810 to 1870 and may be a circuit for conveying communications (e.g., a control message and/or data) among the above-described components.

The processor 1820 may include one or more of a central processing unit (CPU), an application processor (AP), or a communication processor (CP). The processor 1820 may perform, for example, data processing or an operation associated with control or communication of at least one other component(s) of the electronic device 1801.

The memory 1830 may include a volatile and/or nonvolatile memory. The memory 1830 may store instructions or data associated with at least one other component(s) of the electronic device 1801. According to various embodiments of the present disclosure, the memory 1830 may store software and/or a program 1840. The program 1840 may include, for example, a kernel 1841, a middleware 1843, an application programming interface (API) 1845, and/or an application (or an application program) 1847. At least a portion of the kernel 1841, the middleware 1843, or the API 1845 may be called an "operating system (OS)."

The kernel 1841 may control or manage system resources (e.g., the bus 1810, the processor 1820, the memory 1830, and the like) that are used to execute operations or functions of other programs (e.g., the middleware 1843, the API 1845, and the application program 1847). Furthermore, the kernel 1841 may provide an interface that allows the middleware 1843, the API 1845, or the application program 1847 to access discrete components of the electronic device 1801 so as to control or manage system resources.

The middleware 1843 may perform a mediation role such that the API 1845 or the application program 1847 communicates with the kernel 1841 to exchange data.

Furthermore, the middleware 1843 may process task requests received from the application program 1847 according to a priority. For example, the middleware 1843 may assign the priority, which makes it possible to use a system resource (e.g., the bus 1810, the processor 1820, the memory 1830, or the like) of the electronic device 1801, to at least one of the application program 1847. For example, the middleware 1843 may process the one or more task requests according to the priority assigned to the at least one, which makes it possible to perform scheduling or load balancing on the one or more task requests.

The API 1845 may be an interface through which the application program 1847 controls a function provided by the kernel 1841 or the middleware 1843, and may include, for example, at least one interface or function (e.g., an instruction) for a file control, a window control, image processing, a character control, or the like.

The I/O interface 1850 may transmit an instruction or data, input from a user or another external device, to other component(s) of the electronic device 1801. Furthermore, the I/O interface 1850 may output an instruction or data, received from other component(s) of the electronic device 1801, to a user or another external device.

The display 1860 may include, for example, a liquid crystal display (LCD), a light-emitting diode (LED) display, an organic LED (OLED) display, or a microelectromechanical systems (MEMS) display, or an electronic paper display. The display 1860 may display, for example, various contents (e.g., a text, an image, a video, an icon, a symbol, and the like) to a user. The display 1860 may include a touch screen and may receive, for example, a touch, gesture, proximity, or hovering input using an electronic pen or a portion of a user's body.

The communication interface 1870 may establish communication between the electronic device 1801 and an external electronic device (e.g., a first external electronic device 1802, a second external electronic device 1804, or a server 1806). For example, the communication interface 1870 may be connected to a network 1862 through wireless communication or wired communication to communicate with the external device (e.g., a second external electronic device 1804 or a server 1806).

The wireless communication may include at least one of, for example, LTE (long-term evolution), LTE-A (LTE Advanced), CDMA (code division multiple access), WCDMA (wideband CDMA), UMTS (universal mobile telecommunications system), WiBro (Wireless Broadband), GSM (Global System for Mobile Communications), or the like, as cellular communication protocol. Furthermore, the wireless communication may include, for example, a local area network 1864. The local area network 1864 may include, for example, at least one of Wi-Fi (wireless fidelity), Bluetooth, near field communication (NFC), global navigation satellite system (GNSS), or the like. The GNSS may include, for example, at least one of GPS (Global Positioning System), Glonass (Global Navigation Satellite System), BeiDou Navigation Satellite System (hereinafter, referred to as "BeiDou"), or the like. Hereinafter, GPS and GNSS may be interchangeably used in the following descriptions. The wired communication may include at least one of, for example, a universal serial bus (USB), a high-definition multimedia interface (HDMI), a recommended standard-132 (RS-132), or a plain old telephone service (POTS). The network 1862 may include at least one of telecommunications networks, for example, a computer network (e.g., LAN or WAN), an internet, or a telephone network.

Each of the first and second external electronic devices 1802 and 1804 may be a device of which the type is different from or the same as that of the electronic device 1801. According to an embodiment of the present disclosure, the server 1806 may include a group of one or more servers. According to various embodiments of the present disclosure, all or a part of operations that the electronic device 1801 will perform may be executed by another or plural electronic devices (e.g., the electronic devices 1802 and 1804 and the server 1806). According to an embodiment of the present disclosure, in the case where the electronic device 1801 executes any function or service automatically or in response to a request, the electronic device 1801 may not perform the function or the service internally, but, alternatively additionally, it may request at least a portion of a function associated with the electronic device 1801 at other device (e.g., the electronic device 1802 or 1804 or the server 1806). The other electronic device (e.g., the electronic device 1802 or 1804 or the server 1806) may execute the requested function or additional function and may transmit the execution result to the electronic device 1801. The electronic device 1801 may provide the requested function or service using the received result or may additionally process the received result to provide the requested function or service. To this end, for example, cloud computing, distributed computing, or client-server computing may be used.

Figure 19:
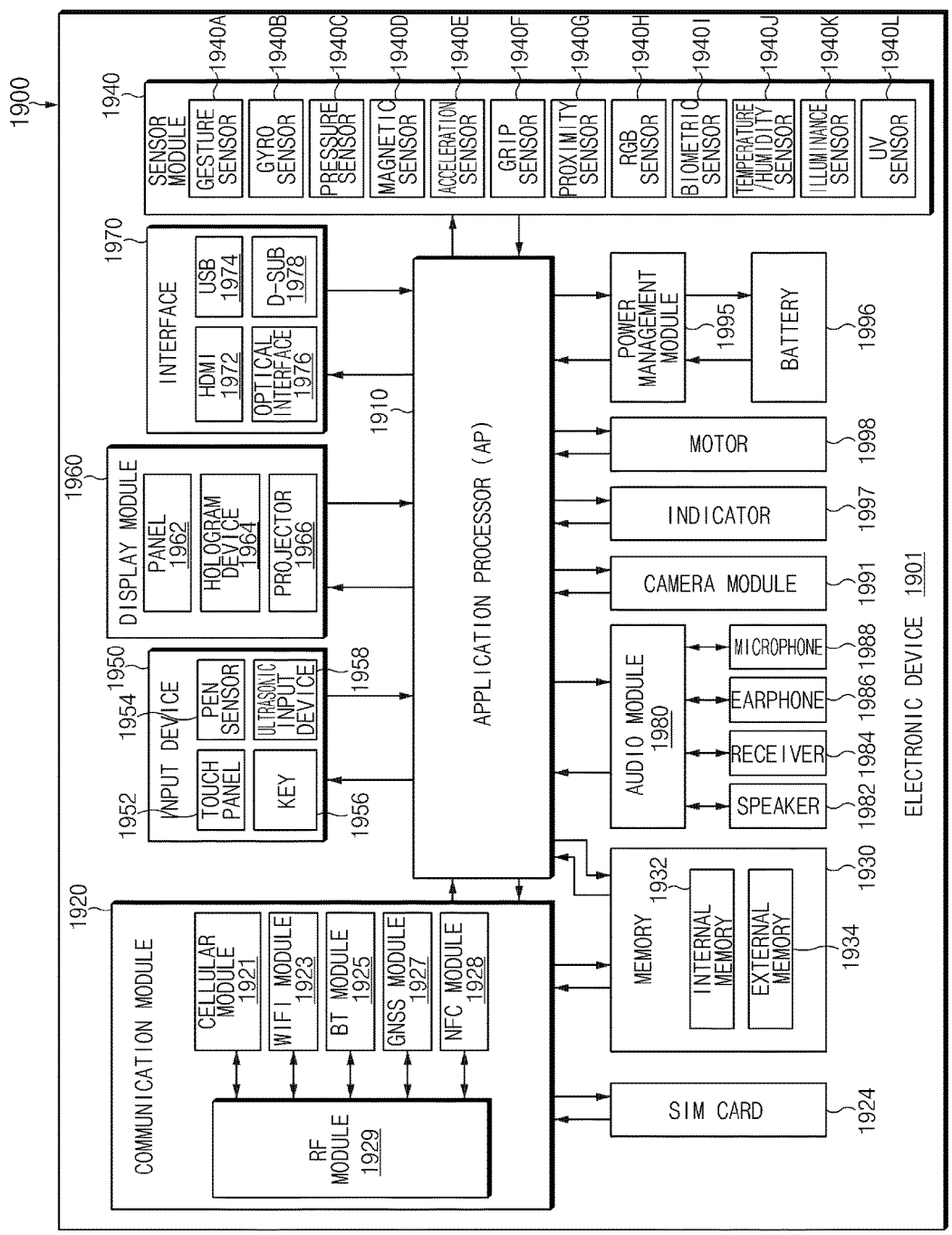
FIG. 19 is a block diagram illustrating an electronic device 1901 according to various embodiments of the present disclosure.

FIG. 19 is a block diagram illustrating an electronic device 1901 according to various embodiments of the present disclosure. The electronic device 1901 may include, for example, all or a part of the electronic device 1801 illustrated in FIG. 18. The electronic device 1901 may include one or more processors (e.g., an AP, a graphics processor, and the like) 1910, a communication module 1920, a subscriber identification module 1924, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may drive an operating system (OS) or an application to control a plurality of hardware or software components connected to the processor 1910 and may process and compute a variety of data. The processor 1910 may be implemented with a System on Chip (SoC), for example. According to an embodiment of the present disclosure, the processor 1910 may further include a graphic processing unit (GPU) and/or an image signal processor. The processor 1910 may include at least a part (e.g., a cellular module 1921) of components illustrated in FIG. 19. The processor 1910 may load and process an instruction or data, which is received from at least one of other components (e.g., a nonvolatile memory), and may store a variety of data at a nonvolatile memory.

The communication module 1920 may be configured the same as or similar to the communication interface 1870 of FIG. 18. The communication module 1920 may include a cellular module 1921, a wireless-fidelity (Wi-Fi) module 1923, a Bluetooth (BT) module 1925, a GNSS module 1927 (e.g., a global positioning system (GPS) module, a Glonass module, BeiDou module, or Galileo module), a near field communication (NFC) module 1928, and a radio frequency (RF) module 1929.

The cellular module 1921 may provide voice communication, video communication, a character service, an Internet service or the like through a communication network. According to an embodiment of the present disclosure, the cellular module 1921 may perform discrimination and authentication of an electronic device 1901 within a communication network using a subscriber identification module 1924 (e.g., a SIM card), for example. According to an embodiment of the present disclosure, the cellular module 1921 may perform at least a portion of functions that the processor 1910 provides. According to an embodiment of the present disclosure, the cellular module 1921 may include a communication processor (CP).

Each of the Wi-Fi module 1923, the BT module 1925, the GNSS module 1927, and the NFC module 1928 may include a processor for processing data exchanged through a corresponding module, for example. According to an embodiment of the present disclosure, at least a portion (e.g., two or more components) of the cellular module 1921, the Wi-Fi module 1923, the BT module 1925, the GNSS module 1927, and the NFC module 1928 may be included within one Integrated Circuit (IC) or an IC package.

The RF module 1929 may transmit and receive a communication signal (e.g., an RF signal). The RF module 1929 may include a transceiver, a power amplifier module (PAM), a frequency filter, a low noise amplifier (LNA), an antenna, or the like. According to various embodiments of the present disclosure, at least one of the cellular module 1921, the Wi-Fi module 1923, the BT module 1925, the GNSS module 1927, or the NFC module 1928 may transmit and receive an RF signal through a separate RF module.

The subscriber identification module 1924 may include, for example, a subscriber identification module and may include unique identify information (e.g., integrated circuit card identifier (ICCID)) or subscriber information (e.g., integrated mobile subscriber identity (IMSI)).

The memory 1930 (e.g., a memory 1830) may include an internal memory 1932 or an external memory 1934. For example, the internal memory 1932 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1934 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1934 may be functionally and/or physically connected to the electronic device 1901 through various interfaces.

The sensor module 1940 may measure, for example, a physical quantity or may detect an operation state of the electronic device 1901. The sensor module 1940 may convert the measured or detected information to an electric signal. The sensor module 1940 may include at least one of a gesture sensor 1940A, a gyro sensor 1940B, a pressure sensor 1940C, a magnetic sensor 1940D, an acceleration sensor 1940E, a grip sensor 1940F, a proximity sensor 1940G, a color sensor 1940H (e.g., red, green, blue (RGB) sensor), a biometric sensor 1940I, a temperature/humidity sensor 1940J, an illuminance sensor 1940K, or an UV sensor 1940L. Although not illustrated, additionally or generally, the sensor module 1940 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 1940 may further include a control circuit for controlling at least one or more sensors included therein. According to an embodiment of the present disclosure, the electronic device 1901 may further include a processor which is a part of the processor 1910 or independent of the processor 1910 and is configured to control the sensor module 1940. The processor may control the sensor module 1940 while the processor 1910 remains at a sleep state.

The input device 1950 may include, for example, a touch panel 1952, a (digital) pen sensor 1954, a key 1956, or an ultrasonic input unit 1958. The touch panel 1952 may use at least one of capacitive, resistive, infrared and ultrasonic detecting methods. Also, the touch panel 1952 may further include a control circuit. The touch panel 1952 may further include a tactile layer to provide a tactile reaction to a user.

The (digital) pen sensor 1954 may be, for example, a part of a touch panel or may include an additional sheet for recognition. The key 1956 may include, for example, a physical button, an optical key, a keypad, and the like. The ultrasonic input device 1958 may detect (or sense) an ultrasonic signal, which is generated from an input device, through a microphone (e.g., a microphone 1988) and may check data corresponding to the detected ultrasonic signal.

The display 1960 (e.g., a display 1860) may include a panel 1962, a hologram device 1964, or a projector 1966. The panel 1962 may be configured the same as or similar to the display 1860 of FIG. 18. The panel 1962 may be flexible, transparent, or wearable. The panel 1962 and the touch panel 1952 may be integrated into a single module. The hologram device 1964 may display a stereoscopic image in a space using a light interference phenomenon. The projector 1966 may project light onto a screen so as to display an image. The screen may be arranged in the inside or the outside of the electronic device 1901. According to an embodiment of the present disclosure, the display 1960 may further include a control circuit for controlling the panel 1962, the hologram device 1964, or the projector 1966.

The interface 1970 may include, for example, an HDMI (high-definition multimedia interface) 1972, a USB (universal serial bus) 1974, an optical interface 1976, or a D-sub (D-subminiature) 1978. The interface 1970 may be included, for example, in the communication interface 1870 illustrated in FIG. 18. Additionally or generally, the interface 1970 may include, for example, a mobile high definition link (MHL) interface, a SD card/multi-media card (MMC) interface, or an infrared data association (IrDA) standard interface.

The audio module 1980 may convert a sound and an electric signal in dual directions. At least a portion of the audio module 1980 may be included, for example, in the input/output interface 1850 illustrated in FIG. 18. The audio module 1980 may process, for example, sound information that is input or output through a speaker 1982, a receiver 1984, an earphone 1986, or a microphone 1988.

The camera module 1991 for shooting a still image or a video may include, for example, at least one image sensor (e.g., a front sensor or a rear sensor), a lens, an image signal processor (ISP), or a flash (e.g., an LED or a xenon lamp).

The power management module 1995 may manage, for example, power of the electronic device 1901. According to an embodiment of the present disclosure, a power management integrated circuit (PMIC), a charger IC, or a battery or fuel gauge may be included in the power management module 1995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1996 and a voltage, current or temperature thereof while the battery is charged. The battery 1996 may include, for example, a rechargeable battery or a solar battery.

The indicator 1997 may display a specific state of the electronic device 1901 or a portion thereof (e.g., a processor 1910), such as a booting state, a message state, a charging state, and the like. The motor 1998 may convert an electrical signal into a mechanical vibration and may generate the following effects: vibration, haptic, and the like. Although not illustrated, a processing device (e.g., a GPU) for supporting a mobile TV may be included in the electronic device 1901. The processing device for supporting a mobile TV may process media data according to the standards of DMB, digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 20:
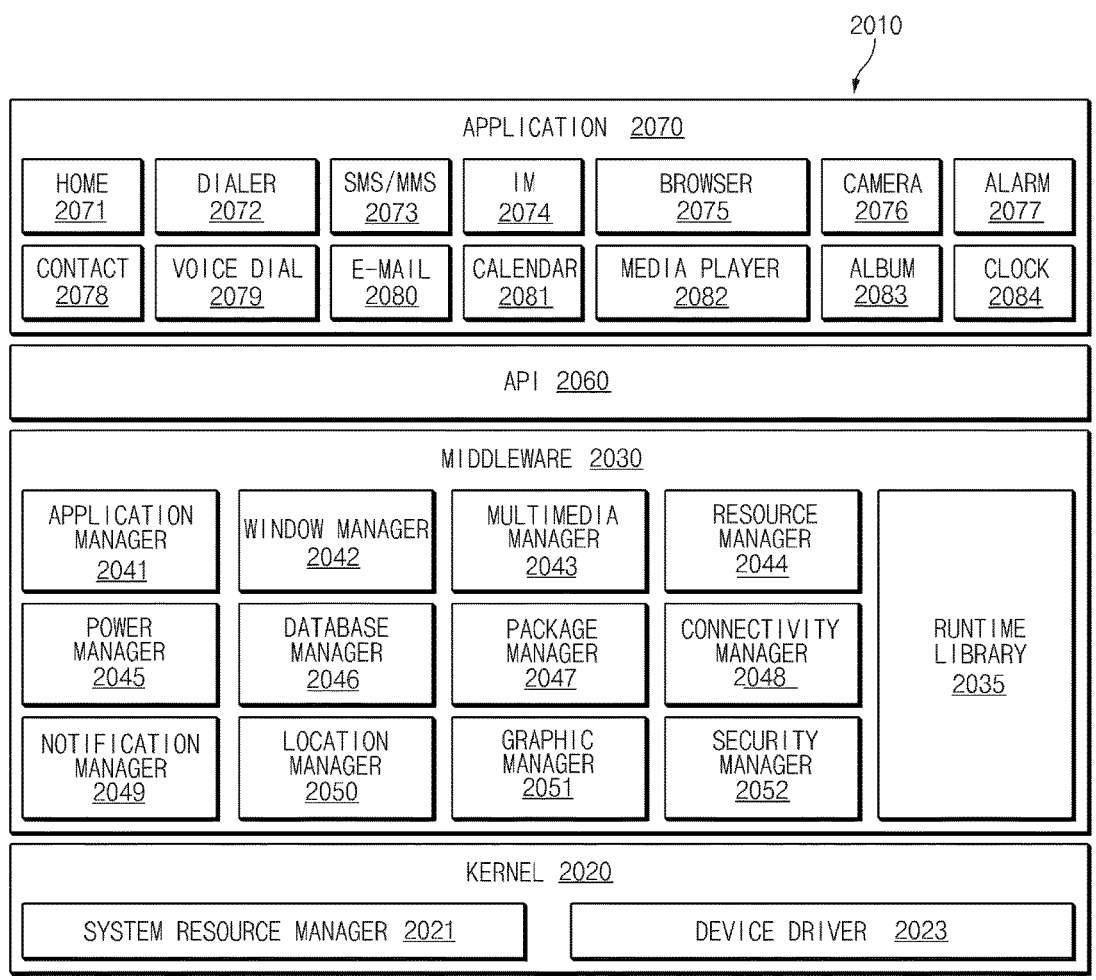
FIG. 20 illustrates a block diagram of a program module 2010 according to various embodiments of the present disclosure.

FIG. 20 illustrates a block diagram of a program module 2010 according to various embodiments of the present disclosure. According to an embodiment of the present disclosure, the program module 2010 (e.g., a program 1840) may include an operating system (OS) to control resources associated with an electronic device (e.g., an electronic device 1801), and/or diverse applications (e.g., an application program 1847) driven on the OS. The OS may be, for example, android, iOS, windows, symbian, tizen, or bada.

The program module 2010 may include a kernel 2020, a middleware 2030, an application programming interface (API) 2060, and/or an application 2070. At least a part of the program module 2010 may be preloaded on an electronic device or may be downloadable from an external electronic device (e.g., an electronic device 1802 or 1804, a server 1806, and the like).

The kernel 2020 (e.g., a kernel 1841) may include, for example, a system resource manager 2021 or a device driver 2023. The system resource manager 2021 may perform control, allocation, or retrieval of system resources. According to an embodiment of the present disclosure, the system resource manager 2021 may include a process managing part, a memory managing part, or a file system managing part. The device driver 2023 may include, for example, a display driver, a camera driver, a Bluetooth driver, a common memory driver, an USB driver, a keypad driver, a Wi-Fi driver, an audio driver, or an inter-process communication (IPC) driver.

The middleware 2030 may provide, for example, a function which the application 2070 needs in common, or may provide diverse functions to the application 2070 through the API 2060 to allow the application 2070 to efficiently use limited system resources of the electronic device. According to an embodiment of the present disclosure, the middleware 2030 (e.g., a middleware 1843) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, or a security manager 2052.

The runtime library 2035 may include, for example, a library module which is used by a compiler to add a new function through a programming language while the application 2070 is being executed. The runtime library 2035 may perform input/output management, memory management, or capacities about arithmetic functions.

The application manager 2041 may manage, for example, a life cycle of at least one application of the application 2070. The window manager 2042 may manage a graphical user interface (GUI) resource which is used in a screen. The multimedia manager 2043 may identify a format necessary for playing diverse media files, and may perform encoding or decoding of media files by using a codec suitable for the format. The resource manager 2044 may manage resources such as a storage space, memory, or source code of at least one application of the application 2070.

The power manager 2045 may operate, for example, with a basic input/output system (BIOS) to manage a battery or power, and may provide power information for an operation of an electronic device. The database manager 2046 may generate, search for, or modify database which is to be used in at least one application of the application 2070. The package manager 2047 may install or update an application which is distributed in the form of package file.

The connectivity manager 2048 may manage, for example, wireless connection such as Wi-Fi or Bluetooth. The notification manager 2049 may display or notify an event such as arrival message, promise, or proximity notification in a mode that does not disturb a user. The location manager 2050 may manage location information of an electronic device. The graphic manager 2051 may manage a graphic effect that is provided to a user, or manage a user interface relevant thereto. The security manager 2052 may provide a general security function necessary for system security or user authentication. According to an embodiment of the present disclosure, in the case where an electronic device (e.g., an electronic device 1801) includes a telephony function, the middleware 2030 may further includes a telephony manager for managing a voice or video call function of the electronic device.

The middleware 2030 may include a middleware module that combines diverse functions of the above-described components. The middleware 2030 may provide a module specialized to each OS kind to provide differentiated functions. Additionally, the middleware 2030 may remove a part of the preexisting components, dynamically, or may add a new component thereto.

The API 2060 (e.g., an API 1845) may be, for example, a set of programming functions and may be provided with a configuration which is variable depending on an OS. For example, in the case where an OS is the android or the iOS, it may be permissible to provide one API set per platform. In the case where an OS is Tizen, it may be permissible to provide two or more API sets per platform.

The application 2070 (e.g., an application program 1847) may include, for example, one or more applications capable of providing functions for a home 2071, a dialer 2072, an SMS/MMS 2073, an instant message (IM) 2074, a browser 2075, a camera 2076, an alarm 2077, a contact 2078, a voice dial 2079, an e-mail 2080, a calendar 2081, a media player 2082, am album 2083, and a clock 2084, or for offering health care (e.g., measuring an exercise quantity or blood sugar) or environment information (e.g., atmospheric pressure, humidity, or temperature).

According to an embodiment of the present disclosure, the application 2070 may include an application (hereinafter referred to as "information exchanging application" for descriptive convenience) to support information exchange between the electronic device (e.g., an electronic device 1801) and an external electronic device (e.g., an electronic device 1802 or 1804). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., an electronic device 1802 or 1804). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., an electronic device 1802 or 1804) which communicates with the electronic device, an application running in the external electronic device, or a service (e.g., a call service or a message service) provided from the external electronic device.

According to an embodiment of the present disclosure, the application 2070 may include an application (e.g., a health care application) which is assigned in accordance with an attribute (e.g., an attribute of a mobile medical device as a kind of electronic device) of the external electronic device (e.g., an electronic device 1802 or 1804). According to an embodiment of the present disclosure, the application 2070 may include an application which is received from an external electronic device (e.g., a server 1806 or an electronic device 1802 or 1804). According to an embodiment of the present disclosure, the application 2070 may include a preloaded application or a third party application which is downloadable from a server. The component titles of the program module 2010 according to the embodiment of the present disclosure may be modifiable depending on kinds of OSs.

According to various embodiments of the present disclosure, at least a portion of the program module 2010 may be implemented by software, firmware, hardware, or a combination of two or more thereof. At least a portion of the program module 2010 may be implemented (e.g., executed), for example, by a processor (e.g., a processor 1910). At least a portion of the program module 2010 may include, for example, modules, programs, routines, sets of instructions, or processes, or the like for performing one or more functions.

The term "module" used herein may represent, for example, a unit including one or more combinations of hardware, software and firmware. The term "module" may be interchangeably used with the terms "unit," "logic," "logical block," "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure, for example, may be implemented by instructions stored in a computer-readable storage media in the form of a programmable module. The instruction, when executed by one or more processors (e.g., the application processor 1810), may perform a function corresponding to the instruction. The computer-readable storage media, for example, may be the memory 1830.

A computer-readable recording media may include a hard disk, a floppy disk, a magnetic media (e.g., a magnetic tape), an optical media (e.g., compact disc read only memory (CD-ROM) and a digital versatile disc (DVD, a magneto-optical media (e.g., a floptical disk), and a hardware device (e.g., read only memory (ROM), random access memory (RAM), a flash memory, or the like). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to various embodiments of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added. While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable electronic device comprising:
   an external housing comprising a first surface, a second surface toward a direction opposite to the first surface, and a first opening formed through the first surface;
   a display disposed in the opening;
   a plate covering the display, forming at least a portion of the first surface, and having a substantially circular shape;
   a first structure forming a portion of the external housing or extending from the external housing;
   a bezel surrounding an outer circumferential surface of the plate, mounted on the external housing to be rotatable, and comprising a surface toward a portion of a surface of the first structure; and
   a second structure disposed between the portion of the surface of the first structure and the surface of the bezel and attached to the first structure, the second structure has a friction coefficient smaller than a friction coefficient of the first structure.

2. The wearable electronic device of claim 1, further comprising a binder attached to a portion of the external housing to be attachable to and detachable from an external substance or a portion of a human's body.

3. The wearable electronic device of claim 1, further comprising a processor and a memory, which are disposed in the external housing and electrically connected to the display, wherein the memory stores instructions allowing the processor to change and display a user interface on the display in response to rotation of the bezel.

4. The wearable electronic device of claim 1, wherein the bezel and the external housing comprise one or more magnetic substances.

5. The wearable electronic device of claim 4, wherein the one or more magnetic substances comprise a plurality of magnetic substances arranged along a periphery of the bezel and spaced apart from each other.

6. The wearable electronic device of claim 5, wherein the external housing comprises an extending part located along the periphery of the bezel and comprises one or more of a plurality of the magnetic substances arranged along the extending part.

7. The wearable electronic device of claim 6, wherein one or more of magnetic substances included in the bezel are arranged at a first interval, one or more of magnetic substances included in the external housing are arranged at a second interval, and the first interval is greater than the second interval.

8. The wearable electronic device of claim 7, wherein the magnetic substances included in the bezel have a first polarity, one portion of one or more of magnetic substances included in the external housing have the first polarity, and the other portion of one or more of magnetic substances included in the external housing have a second polarity.

9. The wearable electronic device of claim 8, wherein the portion of one or more of magnetic substances included in the external housing is alternately arranged with the other portion of the magnetic substances included in the external housing.

10. The wearable electronic device of claim 6, wherein the external housing comprises an extending part located along the periphery of the bezel and comprises a magnetic substance comprising a plurality of portions having different polarities from each other and disposed along the extending part.

11. The wearable electronic device of claim 6, wherein the extending part is placed to surround at least a portion of the outer circumferential surface of the plate when viewed from an upper side of the plate, the one or more of magnetic substances included in the external housing comprise:
   a first set of magnetic substances arranged along a portion of the extending part; and
   a second set of magnetic substances arranged along the other portion of the extending part, and the portion of the extending part is positioned at an opposite side of the plate from the other portion of the extending part.

12. The wearable electronic device of claim 11, further comprising a sensor disposed at the portion of the extending part to sense a rotation of the bezel.

13. The wearable electronic device of claim 2, wherein each of the bezel and the external housing comprises a recess inwardly recessed and comprises a separation preventing part having a substantially ring shape and alternately inserted into the recess of each of the bezel and the external housing to prevent the bezel from being separated from the external housing.

14. The wearable electronic device of claim 5, wherein a plurality of holes is formed along an inner lower surface at a lower end of the bezel such that the holes are spaced apart from each other by a predetermined angle, and an insertion member supported by an elastic member at an inner upper surface of the external housing such that the insertion member is inserted into the holes while being disposed at a lower end of the holes.

15. The wearable electronic device of claim 12, wherein the sensor sensing the rotation of the bezel comprises a first sensor disposed adjacent to a lower surface of the bezel to sense a pattern formed on the lower surface of the bezel.

16. The wearable electronic device of claim 15, wherein the sensor sensing the rotation of the bezel further comprises a second sensor disposed adjacent to the lower surface of the bezel to sense the magnetic substance.

17. The wearable electronic device of any one of claim 1, wherein the bezel comprises an insulating part formed of an insulating material and disposed between the plate and the external housing formed of a metallic material.

\* \* \* \* \*